(12) United States Patent
Shimoyama et al.

(10) Patent No.: US 8,221,883 B2
(45) Date of Patent: Jul. 17, 2012

(54) GRAPHITE SHEET AND MANUFACTURING METHOD OF THE SAME

(75) Inventors: Naoyuki Shimoyama, Saitama (JP); Takehiko Nunokawa, Tokyo (JP)

(73) Assignee: Polymatech Co., Ltd., Tokyo (JP)

( * ) Notice: Subject to any disclaimer, the term of this patent is extended or adjusted under 35 U.S.C. 154(b) by 842 days.

(21) Appl. No.: 12/361,200

(22) Filed: Jan. 28, 2009

(65) Prior Publication Data

US 2009/0220793 A1 Sep. 3, 2009

(30) Foreign Application Priority Data

Feb. 28, 2008 (JP) ................................. 2008-048269

(51) Int. Cl.
*B32B 9/00* (2006.01)
*C01B 31/04* (2006.01)

(52) U.S. Cl. ....... 428/408; 423/488; 264/29.1; 264/29.3

(58) Field of Classification Search ........................ None
See application file for complete search history.

(56) References Cited

U.S. PATENT DOCUMENTS

| 6,451,418 B1 | 9/2002 | Tobita |
| 2003/0194544 A1 | 10/2003 | Tobita et al. |
| 2005/0249961 A1 | 11/2005 | Saitoh et al. |

FOREIGN PATENT DOCUMENTS

| CN | 1112086 A | 11/1995 |
| EP | 1 039 537 A2 | 9/2000 |
| EP | 1 352 922 A2 | 10/2003 |
| EP | 1 384 743 A1 | 1/2004 |
| EP | 1 829 915 A1 | 9/2007 |
| JP | 1-49642 B2 | 12/1986 |
| JP | 2003-321554 A | 11/2003 |

*Primary Examiner* — Timothy Speer
(74) *Attorney, Agent, or Firm* — Seager, Tufte & Wickhem LLC

(57) ABSTRACT

For a graphite sheet, a peak intensity ratio (P100/002) of a (100) diffraction peak and a (002) diffraction peak by X-ray diffractometry, and a peak intensity ratio (P110/002) of a (110) diffraction peak and a (002) diffraction peak thereby are set at 10 or more. The graphite sheet is manufactured through a step of preparing a polymer liquid which contains a polymer having carbon in its molecular chains and develops optical anisotropy, a step of unidirectionally orienting the molecular chains of the polymer, a step of obtaining a compact from the polymer liquid in the state that the orientation of the molecular chains of the polymer is maintained, and a step of carbonizing and thereafter graphitizing the compact.

7 Claims, 4 Drawing Sheets

GRAPHITE SHEET AND MANUFACTURING METHOD OF THE SAME

BACKGROUND OF THE INVENTION

The present invention relates to a graphite sheet having anisotropy of physical properties, and a method for manufacturing the graphite sheet.

As graphite sheets, ones formed by stretching a mixture of a graphite powder and a binder resin, or by stretching expanded graphite into a sheet shape are known. Japanese Examined Patent Publication No. 1-49642 discloses a method for manufacturing a graphite sheet having flexibility by a thermal treatment and a rolling treatment of a polyimide film being a polymer film. Graphite sheets have an electric conductivity and a thermal conductivity excellent in the direction along the sheet surface, i.e. in the in-plane direction. The graphite sheet obtained by baking a polyimide film has properties of being highly flexible and hardly foldable.

In semiconductor packages for which the tendency of size reduction and thickness reduction accelerates and electronic devices for which function enhancement and performance enhancement progresses, the generated heat amount of exothermic bodies such as mounted devices and electronic components increases, and the exothermic bodies are highly densely mounted. Hence, technologies to effectively diffuse heat from exothermic bodies are demanded. However, conventional graphite sheets cannot sufficiently satisfy such a requirement.

SUMMARY OF THE INVENTION

It is an objective of the present invention to provide a graphite sheet suitably usable in applications, for example, to thermal diffusion from exothermic bodies, and a method for manufacturing the graphite sheet.

In order to achieve the foregoing objective and in accordance with a first objective of the present invention, a graphite sheet is provided. The peak intensity ratio (P100/002) of the (100) diffraction peak and the (002) diffraction peak by X-ray diffractometry, and the peak intensity ratio (P110/002) of the (110) diffraction peak and the (002) diffraction peak by X-ray diffractometry are set at 10 or more.

In accordance with a second aspect of the present invention, a method for manufacturing the graphite sheet according to the first aspect is provided. The method includes: preparing a polymer liquid which contains a polymer having carbon in molecular chains thereof and develops optical anisotropy; unidirectionally orienting the molecular chains of the polymer in a certain direction; obtaining a compact from the polymer liquid in a state that the orientation of the molecular chains of the polymer is maintained; and carbonizing and thereafter graphitizing the compact.

DETAILED DESCRIPTION OF THE PREFERRED EMBODIMENTS

Hereinafter, one embodiment in which a graphite sheet of the present invention is embodied will be described by way of drawings.

Figure 1:
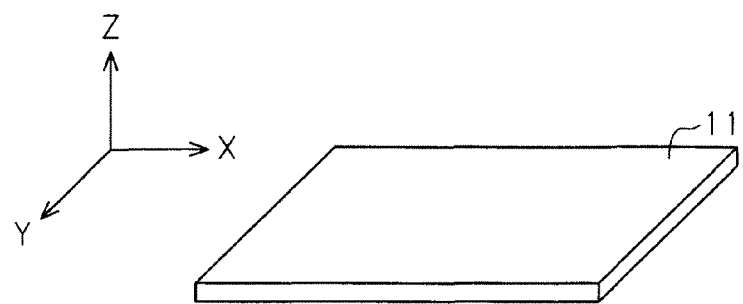
FIG. 1 is a perspective view showing a graphite sheet according to one embodiment of the present invention.

As shown in FIG. 1, a graphite sheet 11 is formed in a film shape, and used in various applications. Applications of the graphite sheet 11 include, for example, wiring board materials, sealants, oriented films for displays, film substrates for polarization films, film substrates for magnetic recording, films for capacitors, solar batteries, planar exothermic bodies, films for countermeasures of electromagnetic waves, sensors, actuators, materials for batteries, mounting materials, gas barrier materials, laminate films, filters, separation membranes, ion exchange membranes, and thermal diffusion sheets. The graphite sheet 11 is suitably used in applications requiring anisotropy of physical properties of the graphite sheet 11 because it develops anisotropy excellent in the physical properties.

In the graphite sheet 11, a plurality of graphite layers are mutually laminated. The graphite layers are oriented, for example, in the direction (Z axis direction in FIG. 1) parallel with the thickness direction of the graphite sheet 11. Alternatively, the graphite layers are oriented in one direction (X axis direction or Y axis direction in FIG. 1) parallel with the surface of the sheet 11. Hence, the graphite sheet 11 develops anisotropy of physical properties in the orientation direction of the graphite layers. Physical properties of the graphite sheet 11 include, for example, thermal properties such as thermal conductivity, magnetic properties, mechanical properties and electric properties. In the graphite sheet 11, the thermal conductivity in the orientation direction of the graphite layers is raised, for example, to 1 W/m·K or more. That is, the graphite sheet 11 develops anisotropy excellent in thermal conductivity in the orientation direction of the graphite layers.

The orientation of the graphite layers is expressed by the peak intensity ratio of a (100) diffraction peak and a (002) diffraction peak by X-ray diffractometry and the peak intensity ratio of a (110) diffraction peak and a (002) diffraction peak. In the present description, the peak intensity ratio of a (100) diffraction peak and a (002) diffraction peak is referred to as a peak intensity ratio (P100/002); and the peak intensity ratio of a (110) diffraction peak and a (002) diffraction peak is referred to as a peak intensity ratio (P110/002). In the graphite sheet 11, the respective peak intensity ratios are set at 10 or more, and preferably 11.0 to 50.0. With the respective peak intensity ratios of less than 10, the orientation of the graphite layers is insufficient and the thermal diffusivity of the graphite sheet 11 decreases. Exceeding 50.0 in the respective peak intensity ratios is practically difficult.

Figure 2:
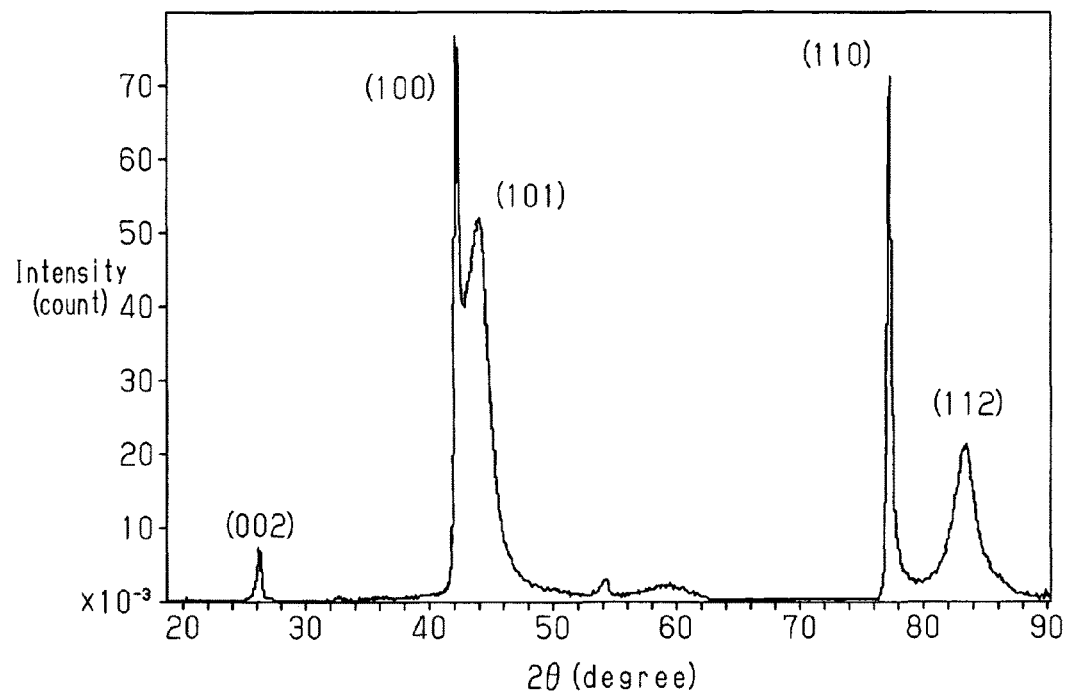
FIG. 2 is a diagram showing a diffraction pattern in X-ray diffractometry.

The X-ray diffractometry is a method of measuring diffraction patterns using CuKα as the X-ray source and a highly pure silicon as the standard substance. Each peak intensity ratio is determined by the following manner. The wide angle X-ray diffractometry (reflection) is conducted in which X-rays are irradiated on the surface of a graphite sheet 11, and a diffraction pattern as shown in FIG. 2 is obtained. At this time, X-rays are irradiated on the surface of the graphite sheet 11 whose normal line is the direction of applying magnetic lines of force in manufacture of the graphite sheet 11. Then, a base line is drawn on the diffraction pattern and the respective heights of a (002) diffraction peak, a (100) diffraction peak and a (110) diffraction peak from the base line are determined. Then the peak intensity ratio (P100/002) is determined by dividing the height of the (100) diffraction peak by the height of the (002) diffraction peak; and the peak intensity ratio (P110/002) is determined by dividing the height of the (110) diffraction peak by the height of the (002) diffraction peak. In the diffraction pattern shown in FIG. 2, the peak intensity ratio (P100/002) is 11.9; and the peak intensity ratio (P110/002) is 11.5.

The plane spacing (d002) between the graphite layers is preferably less than 0.3420 nm, and more preferably 0.3354 nm or more and less than 0.3420 nm. The plane spacing (d002) between the graphite layers is calculated from the position of the obtained (002) diffraction peak and its half value width using the JSPS (Japan Society for the Promotion of Science) method. The plane spacing (d002) between the graphite layers approaches 0.3354 nm, the theoretical value for the graphite crystal as graphitization of the graphite sheet 11 progresses. With the plane spacing (d002) between the graphite layers of 0.3420 nm or more, since the graphite sheet 11 has an irregular laminate structure of the graphite layers, the thermal conductivity of the graphite sheet 11 may possibly decrease. Further, the distance between the graphite layers is excessively wide and the anisotropy of physical properties of the graphite sheet 11 is not sufficiently exhibited. The lower limit of the plane spacing (d002) is 0.3354 nm, the theoretical value for the graphite crystal.

The thickness of the graphite sheet 11 in a film shape is preferably 1 μm to 2 mm. With the thickness of the graphite sheet 11 of less than 1 μm, the sheet 11 is liable to generate defects such as breaking. With the thickness of the graphite sheet 11 exceeding 2 mm, forming of the sheet 11 becomes difficult and the manufacturing cost of the sheet 11 increases.

The graphite sheet 11 is manufactured through a step of preparing a polymer liquid, a step of unidirectionally orienting molecular chains of the polymer, a step of obtaining a compact from the polymer liquid in the state that the orientation of the molecular chains of the polymer is maintained, and a step of graphitizing the compact after carbonizing the compact.

In the step of preparing a polymer liquid, a polymer liquid is prepared by dissolving a polymer having carbon in its molecular chains in a solvent. The polymer is preferably dissolved in a solvent in a concentration of the polymer in which the polymer solution develops the optical anisotropy. In this case, the prepared polymer solution develops the optical anisotropy. In a polymer solution developing the optical anisotropy, molecular chains of the polymer in the solution have a certain regularity. Polymers having carbon in molecular chains include, for example, poly-paraphenylene terephthalamide, polybenzimide, polyparaphenylene, and polybenzazole. Among them preferably used is polybenzazole because it has excellent thermal conductivity, thermal resistance and mechanical properties, and rigidity. Poly-paraphenylene terephthalamide, polybenzimide, polyparaphenylene and polybenzazole exhibit the lyotropic liquid crystallinity in a limited concentration range of the polymer solution.

Polybenzazole includes at least one selected from polybenzoxazol (PBO), polybenzothiazole (PBT), and polybenzimidazole (PBI). Such polybenzazole includes, for example, a homopolymer composed of only one of PBO, PBT and PBI, a mixture, a block copolymer, or a random copolymer composed of two or more selected from PBO, PBT, and PBI, and a copolymer containing at least one of PBO, PBT, and PBI.

PBO is a polymer composed of recurring units having at least one oxazole ring bonded to an aromatic group. PBO includes, for example, poly(phenylenebenzobisoxazole). PBT is a polymer composed of recurring units having at least one thiazole ring bonded to an aromatic group. PBT includes, for example, poly(phenylenebenzobisthiazole). PBI is a polymer composed of recurring units having at least one imidazole ring bonded to an aromatic group. PBI includes, for example, poly(phenylenebenzobisimidazole).

Specifically, polybenzazole according to the present embodiment contains at least one of recurring units represented by the general formulas (1) to (4) shown below.

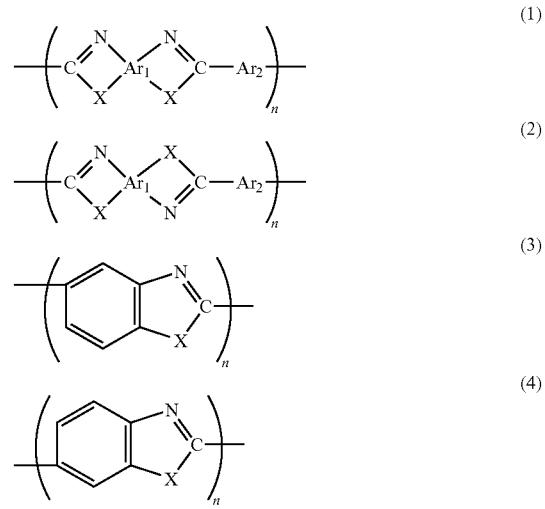

In the general formulas (1) to (4) shown above, X denotes a sulfur atom, an oxygen atom or an imino group; $Ar_1$ and $Ar_2$ denote an aromatic hydrocarbon group; and n denotes an integer of 10 to 500.

Aromatic hydrocarbon groups denoted as $Ar_1$ include groups represented by the general formulas (1) to (IV) shown below; and aromatic hydrocarbon groups denoted as $Ar_2$ include groups represented by the general formulas (V) to (VIII) shown below.

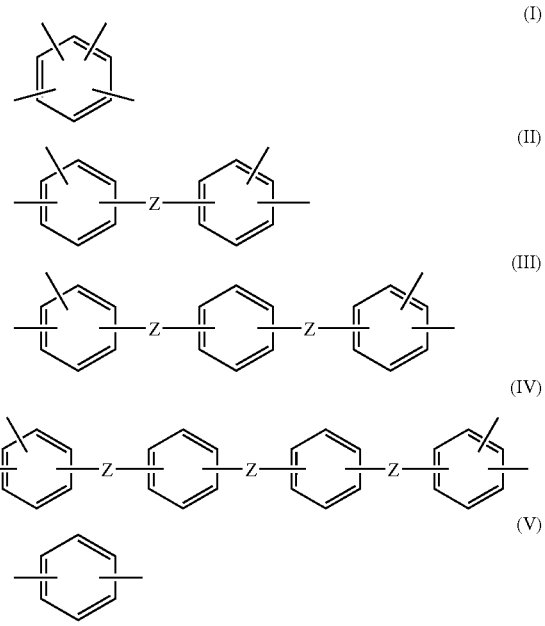

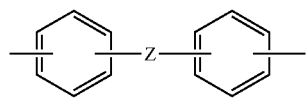

(VI)

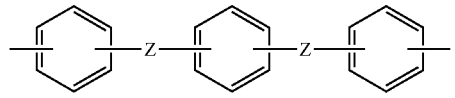

(VII)

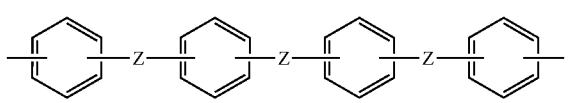

(VIII)

In the general formulas (I) to (VIII) shown above, Z denotes an oxygen atom, a sulfur atom, $SO_2$, CO, $CH_2$, $C(CH_3)_2$, $CF_2$ or $C(CF_3)_2$, or a direct bond between carbons in adjacent benzene rings. In the benzene rings in the general formulas (I) to (VIII) shown above, a hydrogen atom bonded with a carbon atom may be substituted with, for example, a lower alkyl group, a lower alkoxyl group, a halogen atom, a halogenated alkyl group such as trifluoromethyl, a nitro group, a sulfonic acid group or a phosphonic acid group. This substitution may be performed before the polycondensation reaction in synthesis of a polybenzazole or after the synthesis of the polybenzazole.

Polybenzazole preferably contains at least one of a recurring unit represented by the general formula (1) shown above and a recurring unit represented by the general formula (2) shown above. Here, X denotes an oxygen atom; in $Ar_1$ and $Ar_2$ in the general formulas (1) to (VIII) shown above, Z denotes an oxygen atom, or a direct bond between carbons in adjacent benzene rings. In these structures, the molecular chains of the polybenzazole are linear, which highly orients the molecular chains in a subsequent process.

Polybenzazole may contain, in addition to the recurring units represented by the general formulas (1) to (4) shown above, recurring units having unreacted ring-opened moieties represented by the general formulas (IX) and (X) shown below.

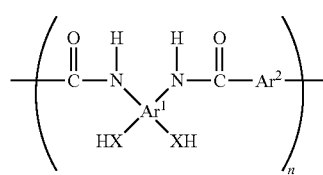

(IX)

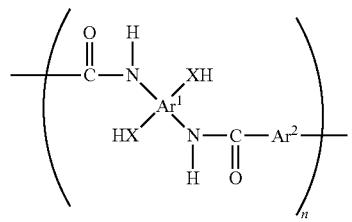

(X)

In the general formulas (IX) and (X), the definitions of X, $Ar_1$, $Ar_2$ and n are the same as described above.

The limiting viscosity of polybenzazole is preferably 0.5 to 30 dl/g, more preferably 0.5 to 20 dl/g, and most preferably 0.5 to 15 dl/g, by measurement using an Ostwald viscometer under an atmosphere of 25° C. using methanesulfonic acid as a solvent (according to the American Society for Testing and Materials Standards, ASTM D2857-95). With the limiting viscosity of polybenzazole of less than 0.5 dl/g, since the polybenzazole has a low molecular weight, forming of a graphite sheet 11 becomes difficult. With the limiting viscosity of polybenzazole exceeding 30 dl/g, the viscosity of the polymer solution is excessively high and the molecular chains of polybenzazole are hardly oriented in a subsequent process.

Solvents include, for example, aprotic polar solvents, polyphosphoric acid, methanesulfonic acid, cresol, and a high-concentration sulfuric acid (for example, 36N sulfuric acid). Aprotic polar solvents include, for example, N,N-dimethylacetamide, N,N-dimethylformamide, dimethyl sulfoxide, N-methylpyrrolidone, and hexamethylphosphortriamide. These may be used singly or in combination of two or more. Among them preferable are polyphosphoric acid, methanesulfonic acid and a mixture thereof, and more preferable is a polyphosphoric acid, because the polymer exhibits a high solubility. In order to raise the solubility of a polymer, a Lewis acid may be added to a solvent. Lewis acids include, for example, lithium bromide, lithium chloride, and aluminum chloride.

The concentration of a polymer in the polymer solution is affected mainly by the solubility of the polymer to a solvent, and physical factors of the polymer solution, e.g. the viscosity. Since molecular chains of a polymer can be highly oriented in a subsequent process, the polymer solution preferably develops at least partially liquid crystallinity.

Therefore, the concentration of the polymer in the polymer solution is preferably set in such a range that the polymer develops sufficiently liquid crystallinity. In the case of using a polybenzazole as a polymer, the concentration of the polybenzazole in the polymer solution is preferably 2 to 30% by mass, more preferably 5 to 25% by mass, and most preferably 5 to 20% by mass.

With the concentration of a polybenzazole of less than 2% by mass, since the concentration of the polybenzazole is excessively low, the polymer solution cannot sufficiently develop liquid crystallinity. With the concentration of the polybenzazole exceeding 30% by mass, since the viscosity of the polymer solution is excessively high, the molecular chains of the polybenzazole are hardly orientated in a subsequent process.

A polymer solution may contain small amounts of components other than a polymer. Components other than a polymer include, for example, reinforcing materials such as glass fiber, various fillers, pigments, dyes, fluorescent brighteners, dispersants, stabilizers, ultraviolet absorbents, antistatic agents, antioxidants, thermostabilizers, lubricants, and plasticizers. Dissolving of a polymer to a solvent is performed by a well-known method. At this time, before dissolving of a polymer to a solvent, the polymer may be purified by a well-known method such as reprecipitation of the polymer.

Figure 3:
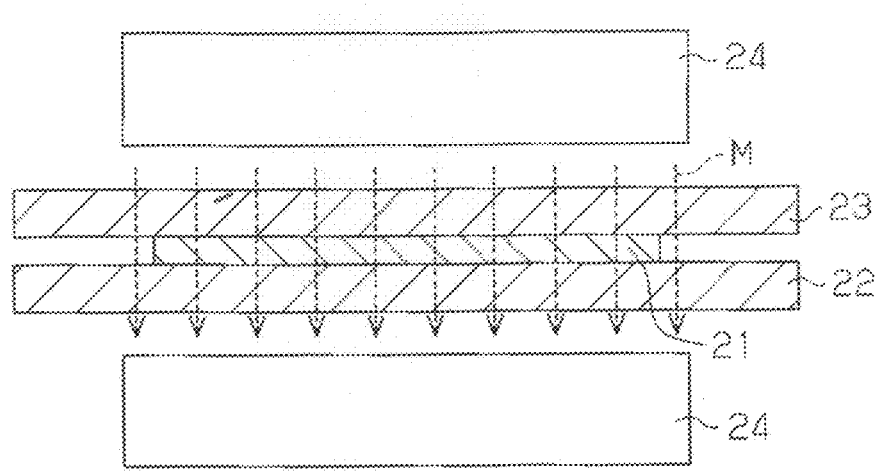
FIG. 3 is a conceptual view showing a manufacturing process of a graphite sheet.

In a process in which molecular chains of a polymer are oriented unidirectionally, the polymer solution is, for example, cast on a substrate from a die (slit die), or coated on a substrate by casting. As shown in FIG. 3, after a polymer solution 21 is cast or coated on a substrate 22, another substrate 23 may be arranged on the polymer solution 21 to sandwich the polymer solution 21 between the substrates 22 and 23. This suppresses degradation of the polymer solution 21 caused by the contact with air because portions where the polymer solution 21 is exposed to air are reduced.

The kinds of the substrates 22 and 23 are selected depending on the shape of the graphite sheet 11. To obtain a graphite sheet 11 having a long film shape, specific examples of the substrates include, for example, closed-loop endless belts, endless drums and endless films. As the substrates 22 and 23, plate-shaped objects such as glass plates and resin films may be used. The materials of the substrates 22 and 23 include, for example, glasses, resins and metals. Metals preferably include stainless steels, Hastelloy alloys and tantalum.

In the case where a polymer solution develops the lyotropic liquid crystallinity, the development of the liquid crystallinity depends on the concentration and the temperature of a polymer in the polymer solution. Therefore, before the orientation of molecular chains of the polymer and during the orientation thereof, the polymer solution may be heated in order to develop the liquid crystallinity. Specifically, the polymer solution cast or coated on the substrate 22 is heated to a temperature range to develop the liquid crystallinity. Alternatively, the polymer solution cast or coated on the substrate 22 is heated to a higher temperature range than a temperature range to exhibit the liquid crystallinity. At this time, the polymer solution is transformed to a homogeneous non-liquid crystal state. Then, the polymer solution is gradually cooled to a temperature range to develop the liquid crystallinity.

The transformation by heating and the cooling of the polymer solution provide a more largely grown liquid crystal phase than the case described above of only heating the polymer solution. In the heating and cooling of the polymer solution, heating and cooling may be repeated. In the case of using a polybenzazole solution as a polymer solution, the heating temperature for the polybenzazole solution to develop the lyotropic liquid crystallinity is usually 40 to 250° C., preferably 40 to 200° C., and most preferably 60 to 160° C. Heating means of a polymer solution is not particularly limited, and includes, for example, a heating method by a high-temperature humidified air, a heating method by irradiation of ultraviolet rays from an ultraviolet-ray lamp, and a dielectric heating method.

Methods for orienting molecular chains of a polymer include methods for orienting the molecular chains of the polymer in the polymer solution by at least one external field selected from, for example, a flow field, a shear field, a magnetic field and an electric field. Among the external fields, a magnetic field and an electric field are preferably used, and a magnetic field is most preferably used, because the orientation degree of molecular chains of a polymer can easily be controlled. That is, preferably, molecular chains of a polymer are oriented by application of a magnetic field.

At this time, the molecular chains of the polymer are oriented along magnetic lines of force of the magnetic field. Means for generating a magnetic field applied to a polymer solution includes, for example, permanent magnets, electromagnets, superconductive magnets and coils.

In the case of using a polybenzazole solution as a polymer solution, the magnetic flux density of a magnetic field applied to the polybenzazole solution is preferably 1 to 30 tesla (T), more preferably 2 to 25 T, and most preferably 3 to 20 T. With the magnetic flux density of less than 1 T, molecular chains of the polybenzazole cannot sufficiently be oriented. With the magnetic flux density exceeding 30 T, the cost for obtaining a magnet field having the magnetic flux density unpractically increases.

In a process for obtaining a compact from a polymer solution, the polymer solution is coagulated by a method comprising evaporation of a solvent in the polymer solution or a method using a coagulating liquid to obtain a polymer base, and thereafter, the polymer base is hardened to obtain the compact. The coagulating liquid has a compatibility with the solvent in the polymer solution. Further, the polymer does not dissolve in the coagulating liquid. The coagulating liquid contacts the polymer solution and then only the solvent in the polymer solution dissolves in the coagulating liquid. Consequently, the polymer in the polymer solution deposits and the polymer solution coagulates. The evaporation of a solvent necessitates a heating apparatus to evaporate the solvent and an apparatus to recover the evaporated solvent. By contrast, the method using a coagulating liquid does not necessitate the above-mentioned apparatuses. Therefore, the method using a coagulating liquid can more easily coagulate a polymer solution than the evaporation of a solvent. Further, in the case of using a strong acid, e.g. a polyphosphoric acid, the strong acid can be diluted with the coagulating liquid.

Coagulating liquids include, for example, water, a phosphoric acid aqueous solution, a sulfuric acid aqueous solution, a sodium hydroxide aqueous solution, methanol, ethanol, acetone and ethylene glycol. These may be used singly or in combination of two or more. As a coagulating liquid, a phosphoric acid aqueous solution of 10 to 70% by mass and a lower alcohol are preferably used because the interchange between a solvent in a polymer solution and the coagulating liquid is mild and the roughening of the surface of a compact obtained can be suppressed.

The temperature of a coagulating liquid is preferably −60 to 60° C., more preferably −30 to 30° C., and most preferably −20 to 20° C. With the temperature of the coagulating liquid of less than −60° C., the coagulating rate of a polymer solution is low, bringing about risks of decreasing the productivity and decreasing physical properties of an obtained graphite sheet 11. With the temperature of the coagulating liquid exceeding 60° C., an obtained compact has risks of having a roughened surface and having an inhomogeneous density of the polymer in the compact.

In a process of obtaining a compact, a polymer solution is coagulated and hardened in the state that the orientation of molecular chains of the polymer are maintained, to obtain the compact. Therefore, the molecular chains of the polymer in the compact are oriented unidirectionally. In order to maintain the orientation of molecular chains of a polymer, a magnetic field may be applied to the polymer solution when the polymer solution is coagulated.

A polymer base obtained by coagulation of a polymer solution is preferably cleaned before hardened. The cleaning of the polymer base is performed, for example, by immersing a substrate 22 supporting the polymer base in a cleaning liquid, and running it in the cleaning liquid, or spraying a cleaning liquid to the polymer base. A cleaning liquid to be used is usually water. Water may be used without being heated, or after heated reasonably. Alternatively, a polymer base may be neutralized and cleaned with an alkali aqueous solution, e.g. a sodium hydroxide aqueous solution or a lithium hydroxide aqueous solution, and then, cleaned with water or the like.

Concentrations of an acid fraction, an amino basic component and an inorganic salt in a polymer base after cleaning are preferably each 500 ppm or less. With the concentration exceeding 500 ppm of the each component after cleaning, the component causes a risk of degrading (decomposing) the polymer base, and a risk of deteriorating physical properties of the graphite sheet 11.

A method for hardening a polymer base is not particularly limited, and includes, for example, drying of the polymer base by heating. Methods for heating a polymer base include, for example, a method using a heated gas such as air, nitrogen or argon, a method utilizing radiation heat such as by an electric heater or infrared-ray lamp, and a dielectric heating method. The heating temperature for hardening a polymer base is preferably 100 to 500° C., more preferably 100 to 400°

C., and most preferably 100 to 200° C. With the heating temperature of less than 100° C., the polymer base hardly hardens. With the heating temperature exceeding 500° C., the polymer base has a risk of being decomposed depending on the material of the polymer base because the temperature exceeds the decomposition temperature of the azole polymer. In the case where a polymer in a polymer base has photo-crosslinkability, a method for hardening the polymer base includes a cross-linking reaction of the polymer by light irradiation. When a polymer base is hardened, the outer edge of the polymer base may be restrained to suppress its shrinkage.

In the case of using a graphite sheet 11 together with a substrate 22 as in sealants, oriented films for displays and the like, a polymer base is formed on the substrate 22, and thereafter, the polymer base is hardened on the substrate 22. In the case of using a graphite sheet 11 as a base film as in wiring board materials, magnetic recording film substrates and the like, a polymer base is hardened on a substrate 22 to obtain a compact, and then, the compact is peeled off the substrate 22; or, the polymer base is peeled off the substrate 22, and then hardened, to obtain a compact.

As described above, molecular chains of a polymer in a compact are oriented unidirectionally. In the case where a compact has a prescribed light transparency, the orientation of molecular chains of the polymer in the compact can be confirmed by measurement of optical anisotropy (phase difference, birefringence) using two sheets of polarizers and a polarization microscope. Further, the orientation of molecular chains of a polymer can be confirmed also by a polarized-infrared absorption spectrum, a polarized Raman spectroscopy, an X-ray diffractometry, an electron beam diffractometry, and observation by an electron microscope.

In an obtained compact, the orientation degree A, in the above-mentioned certain direction of molecular chains of a polymer, determined by the expression (1) shown below from X-ray diffractometry is preferably 0.6 or more and less than 1.0, more preferably 0.65 or more and less than 1.0, and most preferably 0.7 or more and less than 1.0.

$$\text{Orientation degree } A=(180-\Delta\beta)/180 \tag{1}$$

In the expression (1), $\Delta\beta$ indicates a half value width when an X-ray diffraction intensity distribution from 0 to 360 degrees in the azimuthal angle direction is measured by fixing the peak scattering angle by X-ray diffractometry. With the orientation degree A of less than 0.6, the orientation of graphite layers in a graphite sheet obtained from a compact is insufficient, and the anisotropy of physical properties such as thermal conductivity decreases. The orientation degree A cannot be a value of 1.0 or more from the expression (1) shown above because a half value width $\Delta\beta$ always has a positive value. With the orientation degree A of 0.6 or more and less than 1.0, graphite layers in a graphite sheet is sufficiently oriented and the graphite sheet exhibits anisotropy excellent in physical properties, i.e. thermal conductivity, in the orientation direction of the graphite layers.

Figure 4:
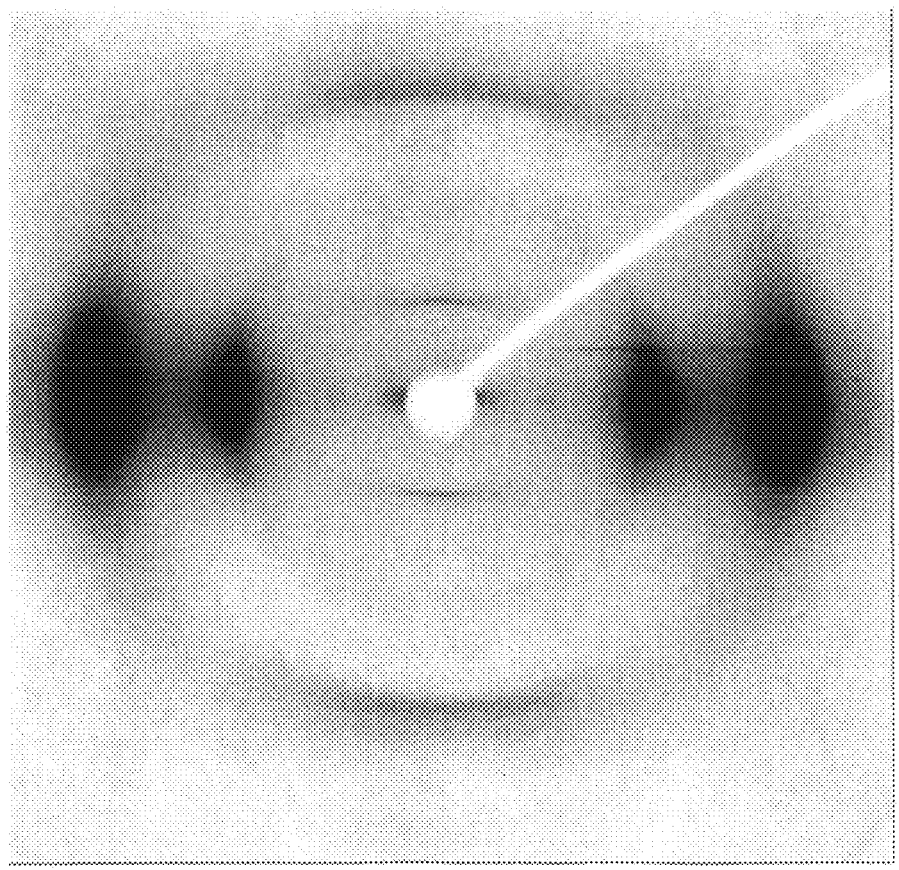
FIG. 4 is a diagram showing a Debye ring.

A method for determining the orientation degree A of molecular chains of a polymer in a compact will be described specifically. In order to determine the orientation degree A of molecular chains of the polymer, the compact is subjected to wide-angle X-ray diffractometry (transmission). In an X-ray diffractometer, irradiation of a sample with X rays provides a concentric arcuate diffraction pattern (Debye ring) corresponding to a lattice spacing of particles (molecular chains of a polymer) contained in the sample. In the case where molecular chains of a polymer are oriented, as shown in FIG. 4, a diffraction figure emerges on a concentric arcuate diffraction pattern for crystals in which a polymer is oriented.

Figure 5:
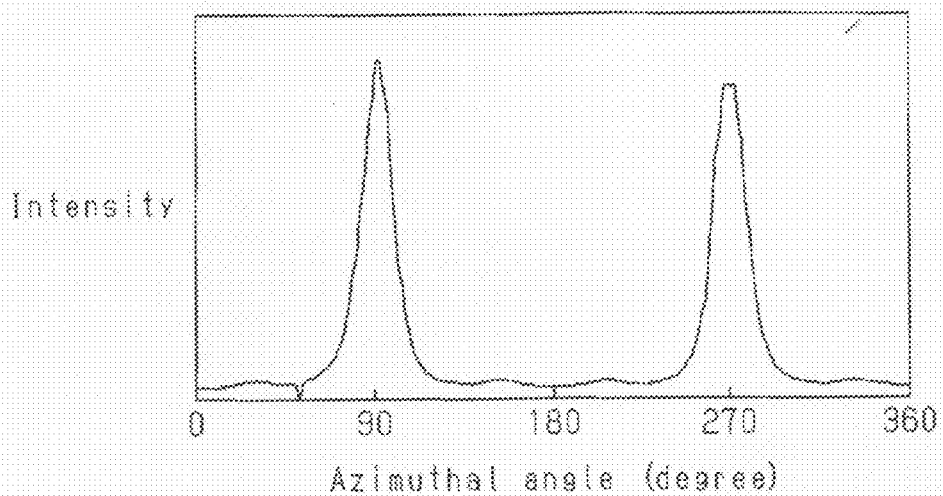
FIG. 5 is a graph showing an X-ray diffraction intensity distribution in the azimuthal angle direction.

Then, an X-ray diffraction intensity distribution from 0 to 360 degrees in the azimuthal angle direction (circumferential direction of the Debye ring) is measured by fixing an angle (peak scattering angle) at which a diffraction peak is obtained on the equatorial line of an obtained diffraction figure. Thereby, an X-ray diffraction intensity distribution in the azimuthal angle direction as shown in FIG. 5 is obtained. A steeper peak in the intensity distribution means that molecular chains of a polymer constituting a compact are more highly oriented unidirectionally. Therefore, in an X-ray diffraction intensity distribution in the azimuthal angle direction, a width (half value width $\Delta\beta$) at the position at half the peak height is determined and an orientation degree A is determined by substituting the half value width $\Delta\beta$ into the expression (1) described above. In the case of the X-ray diffraction intensity distribution in the azimuthal angle direction shown in FIG. 5, the orientation degree A is 0.8.

A process for graphitizing a compact after carbonizing it comprises a step of prebaking the compact in the temperature range of 1,000 to 1,400° C., and a step of regularly baking the prebaked compact in the temperature range of 3,000° C. or lower. In this case, the compact is carbonized in prebaking and graphitized in regular baking. In manufacture of a graphite sheet 11, each step may be continuously performed, or, all or part of each step may be performed intermittently, i.e. in a batch system.

Then, a method for manufacturing a graphite sheet 11 whose graphite layers extend in the thickness direction (Z axis direction in FIG. 1) of the sheet 11 will be described specifically. The graphite sheet 11 has anisotropy excellent in, for example, thermal conductivity in the thickness direction of the sheet 11.

In manufacture of a graphite sheet 11, a polymer solution 21 is first prepared. At this time, the concentration of the polymer in the polymer solution 21 is preferably set in such a range that the polymer solution 21 develops liquid crystallinity. Then, as shown in FIG. 3, the polymer solution 21 is cast on a substrate 22 from a slit die (not shown), and thereafter, another substrate 23 is arranged on the polymer solution 21 to sandwich the solution between the substrates 22 and 23. Then, a pair of permanent magnets 24 as magnetic field generating means is arranged above and below the substrates 22 and 23, respectively, and a magnetic field is applied to the polymer solution 21. At this time, magnetic lines of force M of the magnetic field generated by the pair of permanent magnets 24 extend in the up and down direction of FIG. 3, i.e. along the straight line extending in the Z axis direction of FIG. 1. That is, the S pole and N pole of the pair of permanent magnets 24 are arranged to be opposed to each other.

The polymer solution 21 develops optical anisotropy. That is, molecular chains of the polymer in the solution have a certain regularity. Hence, application of a magnetic field orients the molecular chains in magnetic lines of force of the magnetic field. Specifically, the polymer in the polymer solution 21 is oriented in the up and down direction of FIG. 3 (Z axis direction of FIG. 1). In the case where the polymer solution 21 develops liquid crystallinity, heating apparatuses (not shown) are installed on both sides of the substrates 22 and 23. The polymer solution 21 is heated to a temperature range to develop liquid crystallinity by the heating apparatuses.

Figure 6:
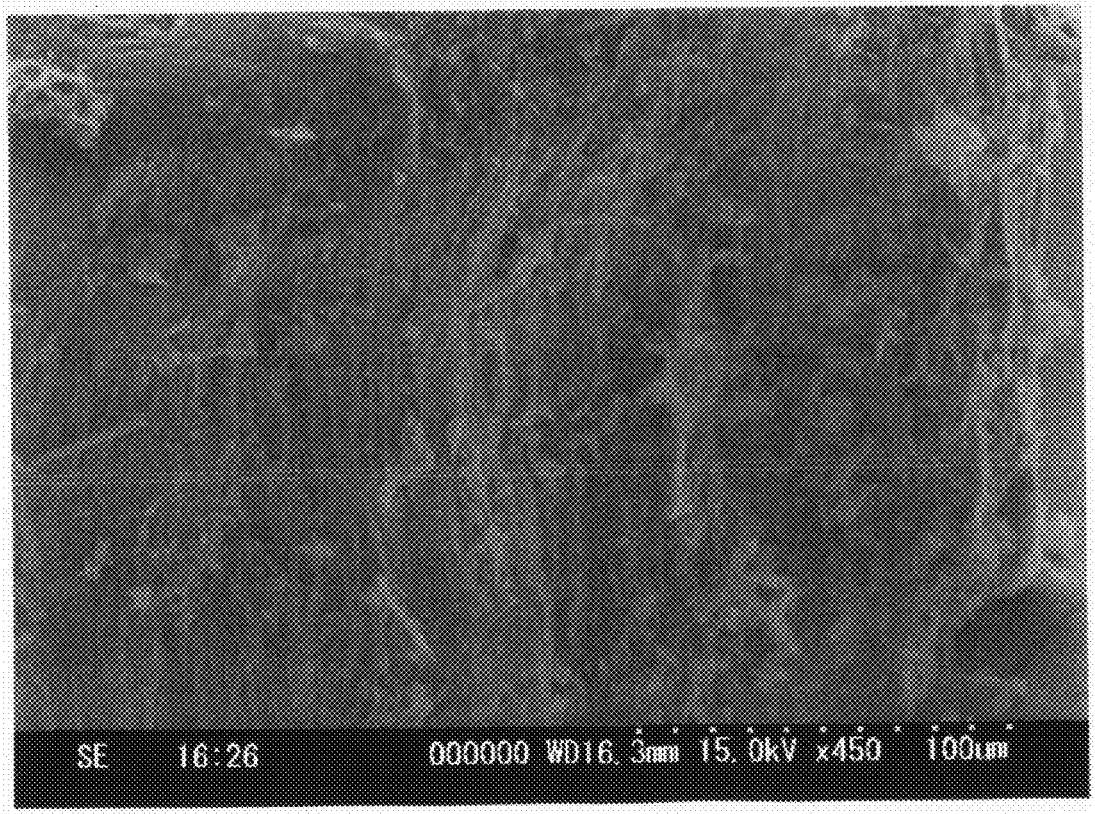
FIG. 6 is a diagram showing an electron micrograph.

Then, in the state that the orientation of molecular chains of the polymer is maintained, the polymer solution 21 coagulates to obtain a polymer base. Then, the polymer base is hardened to obtain a compact, and thereafter, the compact is carbonized and graphitized to manufacture a graphite sheet 11. An electron microgram of the obtained graphite sheet 11 is shown in FIG. 6. FIG. 6 shows an electron microgram of a cut surface of the sheet 11 cut in a surface extending in the thickness direction of the graphite sheet 11.

Next, a method of manufacturing a graphite sheet 11 each of whose graphite layers extends in the direction parallel with the surface of the graphite sheet 11 (X axis direction or Y axis direction of FIG. 1) will be described specifically.

The graphite sheet 11 has anisotropy excellent in, for example, thermal conductivity in the direction parallel with the surface of the sheet.

Figure 7:
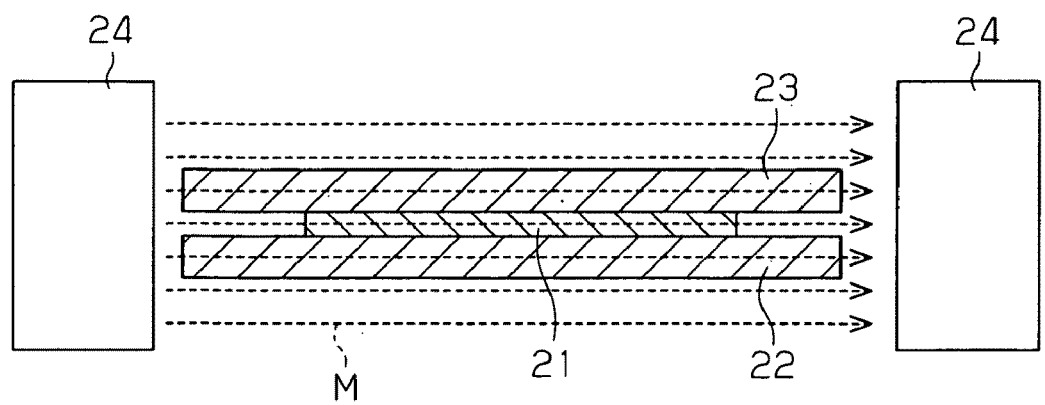
FIG. 7 is a conceptual view showing a manufacturing process of a graphite sheet.

In manufacture of the graphite sheet 11, a polymer solution 21 is first prepared. At this time, the concentration of the polymer in the polymer solution 21 is preferably set in such a range that the solution 21 develops liquid crystallinity. Then, as shown in FIG. 7, the polymer solution 21 is cast on a substrate 22 from a slit die (not shown), and thereafter, another substrate 23 is arranged on the polymer solution 21 to sandwich the solution between the substrates 22 and 23. Then, a pair of permanent magnets 24 as magnetic field generating means is arranged on both sides of the substrates 22 and 23, respectively, and a magnetic field is applied to the polymer solution 21. At this time, magnetic lines of force M of the magnetic field generated by the pair of permanent magnets 24 extend in the right and left direction of FIG. 7, i.e. along the straight line extending in the X axis direction or the Y axis direction of FIG. 1. That is, the S pole and N pole of the pair of permanent magnets 24 are arranged to be opposed to each other.

Since the polymer solution 21 develops optical anisotropy, that is, molecular chains of the polymer in the solution have a certain regularity, application of a magnetic field orients the molecular chains along magnetic lines of force of the magnetic field. Specifically, the polymer in the polymer solution 21 is oriented in the right and left direction of FIG. 7 (X axis direction or Y axis direction of FIG. 1). Then, a graphite sheet 11 is manufactured by the same process as the case of the graphite sheet 11 each of whose graphite layers extends in the thickness direction of the graphite sheet 11.

In the case of using the manufactured graphite sheet 11 as a heat diffusion sheet, the graphite sheet 11 is installed on an exothermic body such as electronic components. At this time, the heat generated by the exothermic body is transferred to the graphite sheet 11. Thereafter, the heat is diffused mainly in the orientation direction of each graphite layer.

Advantages exhibited by the present embodiment will be described hereinafter.

(1) In the graphite sheet 11, the peak intensity ratio (P100/002) and the peak intensity ratio (P110/002) are each set at 10 or more. That is, in the graphite sheet 11, each graphite layer is highly oriented unidirectionally. Hence, the graphite sheet 11 exhibits anisotropy excellent in physical properties in the orientation direction of the graphite layers. Therefore, the graphite sheet 11 can suitably be used in applications requiring anisotropy of physical properties, for example, applications to thermal diffusion from exothermic bodies. Further, the graphite sheet 11 has flexibility, and sufficient durability against bending. Therefore, for example, in the cases where various bent exothermic bodies of electronic devices are arranged and where a plurality of wiring boards as exothermic bodies are highly densely arranged in narrow spaces where heat is easily accumulated, the graphite sheet 11 as a thermal diffusion sheet can be used in the state of being bent.

(2) Setting of the plane spacing (d002) of graphite layers at less than 0.3420 nm sufficiently improves the graphite crystallinity degree of the graphite sheet 11, whereby the sheet 11 sufficiently exhibits anisotropy of physical properties.

(3) The graphite sheet 11 is manufactured through a step of preparing a polymer solution, a step of unidirectionally orienting molecular chains of the polymer in the polymer solution, a step of obtaining a compact from the polymer solution, and a step of graphitizing the compact after carbonizing it. These steps easily provide the graphite sheet 11 each of whose graphite layers is highly oriented unidirectionally.

(4) The step of graphitizing a compact after carbonizing it preferably comprises a step of prebaking a compact in the temperature range of 1,000 to 1,400° C., and a step of regularly baking the prebaked compact in the temperature range exceeding 2,000° C. and less than 3,000° C. In this case, the compact is carbonized in the prebaking and graphitized in the regular baking. Heating in the temperature ranges described above progresses not only carbonization but graphitization of the compact. Thereby, a graphite sheet can easily be obtained in which the plane spacing (d002) of the graphite layers is narrowed up to the range described above. Further, separate performing of the carbonization and the graphitization of the compact securely enables the carbonization and the graphitization of the compact.

(5) Extension of each graphite layer of the graphite sheet 11 in the thickness direction of the sheet 11 permits the graphite sheet 11 to exhibit anisotropy excellent in physical properties in the thickness direction of the sheet 11. Further, extension of each graphite layer of the graphite sheet 11 in the direction parallel with the surface of the sheet 11 permits the graphite sheet 11 to exhibit anisotropy excellent in physical properties in the direction parallel with the surface of the sheet 11.

The present embodiment may be modified as follows.

In place of a polymer solution as a polymer liquid prepared by dissolving a polymer in a solvent, a melt liquid obtained by melting a polymer may be used. In this case, in a process of unidirectionally orienting molecular chains of the polymer, the melt liquid is heated at a temperature at which the state that the polymer is melted can be maintained. In the case of using a polybenzazole as a polymer, the heating temperature of the melt liquid of the polybenzazole is preferably 100 to 450° C., and more preferably 200 to 400° C. In a step of obtaining a compact, the compact is obtained by cooling the melt liquid.

In the pair of permanent magnets 24 shown in FIGS. 3 and 7 each, one of the permanent magnets 24 may be omitted. That is, one permanent magnet 24 may be arranged only on one side of the substrates 22 and 23. Further, the permanent magnets 24 may be arranged such that the magnetic lines of force M extend along a curved line.

In place of the permanent magnets 24, an electric field generating apparatus equipped with electric poles, sliding type autotransformer or the like may be used. That is, in place of a magnetic field, an electric field may be applied to a polymer liquid. In this case, the polymer in the polymer liquid is oriented in the electric field direction. Also in this case, anisotropy excellent in physical properties in the orientation direction of graphite layers is exhibited as in the case where a magnetic field is applied.

A compact may be constituted as a laminate. The lamination method is not particularly limited, and well-known methods are used. Specific examples thereof include a method of lamination in a die, and a method of laminating each layer after the each layer has been individually formed.

An electric insulating layer may be formed on the graphite sheet 11. In this case, the electric insulating layer is preferably composed of a compact, and more preferably composed of a compact formed from a polybenzazole. This imparts the electric insulation to the graphite sheet 11, and also prevent failure of the graphite sheet 11 by protecting the sheet 11.

EXAMPLES

Then, the embodiments described above will be described further specifically by way of Examples and Comparative Examples.

Example 1

300 g of a polyphosphoric acid (115% $P_2O_5$), 5 g of 4,6-diaminoresorcinol dihydrochloride (23.4 mmol) and 4.76 g of terephthalic acid dichloride (23.4 mmol) were charged in a reaction vessel equipped with a stirring apparatus, a nitrogen introducing pipe and a drier, and the solution in the reaction vessel was stirred at an atmosphere of 70° C. for 16 hours. After the solution was stirred, the temperature of the solution was raised stepwise and held for certain times in the order of at 90° C. for 5 hours, 130° C. for 3 hours, 150° C. for 16 hours, 170° C. for 3 hours, 185° C. for 3 hours and 200° C. for 48 hours to react the solution to obtain a crude polybenzoxazol solution. The crude polybenzoxazol solution was observed using a polarization microscope, and the crude polybenzoxazol solution was confirmed to exhibit a liquid crystallinity. Then, the crude polybenzoxazol solution was reprecipitated from methanol, acetone and water to obtain a scrap polybenzoxazole. A polyphosphoric acid was added to the obtained polybenzoxazole to prepare a 12-mass % polybenzoxazole solution as a polymer solution 21. The polybenzoxazole solution was confirmed to exhibit optical anisotropy using a polarization microscope.

As shown in FIG. 3, the polybenzoxazole solution as a polymer solution 21 was sandwiched between substrates 22 and 23, and thereafter, a pair of permanent magnets 24 was arranged above and under the substrates 22 and 23 such that magnetic lines of force M extended in the up and down direction of FIG. 3, that is, extended in the thickness direction (Z axis direction of FIG. 1) of the graphite sheet 11. While a magnetic field having magnetic lines of force of 10 T was applied to the polybenzoxazole solution by these permanent magnets 24, the solution was heated at 100° C. for 20 min, and then naturally cooled to room temperature (25° C.) and allowed to stand.

Then, the polybenzoxazole solution sandwiched between the substrates 22 and 23 was immersed in a mixed solution of methanol and water, and thereafter, the substrate 23 was removed in the mixed solution to coagulate the polybenzoxazole solution. The coagulated polybenzoxazole solution was immersed in the mixed solution for 1 hour, and then further immersed in water for 1 hour. Then, the coagulated polybenzoxazole solution was dried and hardened at 110° C. for 2 hours to obtain a compact.

Then, the obtained compact was put in a baking vessel, prebaked under an argon gas atmosphere at 1,100° C. for 2 hours to carbonize the compact, and then regularly baked at 3,000° C. for 2 hours to graphitize the compact to obtain a graphite sheet 11. The obtained graphite sheet 11 had a thickness of 150 μm.

Example 2

In Example 2, a graphite sheet 11 was obtained as in Example 1, except that the direction of applying the magnetic field was changed as shown in Table 1.

Examples 3 to 5

In Examples 3 to 5 each, a graphite sheet 11 was obtained as in Example 1, except that the baking temperature in the regular baking was changed as shown in Table 1.

Comparative Example 1

In Comparative Example 1, a graphite sheet was obtained as in Example 1, except that the application of a magnetic field was omitted.

Comparative Examples 2 and 3

In Comparative Examples 2 and 3 each, a graphite sheet was obtained as in Example 1, except for that the baking temperatures in the regular baking were changed as shown in Table 2.

The graphite sheet of each Example was measured for items described below. The results are shown in Table 1 and Table 2. In "direction of applying a magnetic field" column in each Table described below, "Z axis direction" indicates application of a magnetic field in the Z axis direction of FIG. 1; and "X axis direction" indicates application of a magnetic field in the X axis direction of FIG. 1; and "none" indicates omission of application of a magnetic field. "Orientation degree A (T)" column indicates the orientation degree A of molecular chains of a polybenzoxazole of a compact; and "-" in the column indicates that the orientation degree A could not be measured. "Baking temperature (° C.)" column indicates a baking temperature in regular baking. "Plane spacing (d002) (nm)" column indicates a plane spacing (d002) between graphite layers in a graphite sheet. "Peak intensity ratio (P100/P002)" column indicates a peak intensity ratio (P100/P002) for a graphite sheet; and "peak intensity ratio (P110/P002)" column indicates a peak intensity ratio (P110/P002) for a graphite sheet. "Thermal conductivity (X axis direction) (W/m·K)" column indicates a thermal conductivity in the X axis direction of FIG. 1 of a graphite sheet; "thermal conductivity (Y axis direction) (W/m·K)" column indicates a thermal conductivity in the Y axis direction of FIG. 1 of a graphite sheet; and "thermal conductivity (Z axis direction) (W/m·K)" column indicates a thermal conductivity in the Z axis direction of FIG. 1 of a graphite sheet.

<Orientation Degree>

The orientation degree A of a polymer compact of each Example was calculated by the expression (1) described above from a half value width Δβ of a peak in an X-ray diffraction intensity distribution obtained by X-ray diffractometry (transmission) of each compact using an X-ray diffractometer (RINT-RAPID, made by Rigaku Corp.). As an Example, with respect to the polymer compact in the process of obtaining the graphite sheet 11 in Example 4, a diffraction pattern by X-ray diffractometry is shown in FIG. 4; and an X-ray diffraction intensity distribution in the azimuthal angle direction at 2θ=about 26°, at which a diffraction peak was obtained, is shown in FIG. 5.

<Peak Intensity Ratio>

For the graphite sheet of each Example, the peak intensity ratio (P100/P002) and the peak intensity ratio (P110/P002) were determined by the reflection measurement of a sheet surface using an X-ray diffractometer (M18XHF22-SRA, made by MAC Science Co., Ltd.). At this time, X rays were irradiated to the surface whose normal line was the direction of applying a magnetic field to a polybenzoxazole in a compact. In this case, in Example 2, after a plurality of graphite sheets 11 were laminated, the graphite sheets 11 were cut along a surface whose normal line was the direction of applying a magnetic field, and X rays were irradiated on the cut surface. In Comparative Examples 1 and 4, X rays were irradiated on a surface whose normal line was the Z axis direction of FIG. 1.

<Thermal Conductivity>

In the graphite sheet of each Example, the thermal conductivity along each axis of FIG. 1 was measured by the laser flash method.

TABLE 1

|  | Example 1 | Example 2 | Example 3 | Example 4 | Example 5 |
|---|---|---|---|---|---|
| Direction of applying a magnetic field | Z axis direction | X axis direction | Z axis direction | Z axis direction | Z axis direction |
| Magnetic lines of force of a magnetic field (T) | 10 | 10 | 10 | 10 | 10 |
| Orientation degree A | 0.91 | 0.94 | 0.89 | 0.88 | 0.89 |
| Baking temperature (° C.) | 3000 | 3000 | 2200 | 2500 | 2700 |
| Plane spacing (d002) (nm) | 0.3370 | 0.3366 | 0.3405 | 0.3378 | 0.3371 |
| Peak intensity ratio (P100/P002) | 11.9 | 18.9 | 18.1 | 16.0 | 13.2 |
| Peak intensity ratio (P110/P002) | 11.5 | 18.3 | 17.5 | 15.2 | 12.8 |
| Thermal conductivity (X axis direction) (W/m·K) | 7.8 | 650 | 4.8 | 5.5 | 6.4 |
| Thermal conductivity (Y axis direction) (W/m·K) | 6.2 | 6.3 | 3.9 | 5.0 | 5.8 |
| Thermal conductivity (Z axis direction) (W/m·K) | 600 | 6.2 | 350 | 460 | 520 |

TABLE 2

|  | Comparative Example 1 | Comparative Example 2 | Comparative Example 3 |
|---|---|---|---|
| Direction of applying a magnetic field | none | Z axis direction | Z axis direction |
| Magnetic lines of force of a magnetic field (T) | — | 10 | 10 |
| Orientation degree A | — | 0.91 | 0.92 |
| Baking temperature (° C.) | 3000 | 1500 | 2000 |
| Layer spacing (d002) (nm) | 0.3369 | 0.344 | 0.3421 |
| Peak intensity ratio (P100/P002) | 0.0099 | 7.5 | 8.9 |
| Peak intensity ratio (P110/P002) | 0.0097 | 7.2 | 8.5 |
| Thermal conductivity (X axis direction) (W/m·K) | 450 | 2.3 | 2.5 |
| Thermal conductivity (Y axis direction) (W/m·K) | 430 | 2.1 | 2.3 |
| Thermal conductivity (Z axis direction) (W/m·K) | 7.4 | 20 | 50 |

As shown in Table 1, since the compact of each Example had a high orientation degree A of 0.6 or more, it was found that molecular chains of the polybenzoxazole in the compact were highly oriented. Further, since the graphite sheet 11 of each Example exhibited a peak intensity ratio of 10 or more, it was found that each graphite layer was highly oriented in the direction of extending magnetic lines of force. From the measurement result of thermal conductivity for each axis, it was found that the graphite sheet 11 of each Example had anisotropy excellent in thermal conductivity in the orientation direction of the graphite layers. Further, the graphite sheet 11 of each Example had flexibility, and sufficient durability against bending. From the above results, it was found that the graphite sheet 11 of each Example can suitably be used in applications requiring anisotropy of physical properties, for example, applications to thermal diffusion from exothermic bodies.

By contrast, as shown in Table 2, since the graphite sheet of Comparative Example 1 had a much lower peak intensity ratio than that of the graphite sheet 11 of each Example, it was found that each graphite layer was not oriented unidirectionally. This is because, in Comparative Example 1, the application of a magnetic field was omitted. Each graphite sheet of Comparative Examples 2 and 3 had a lower peak intensity ratio, of less than 10, than that of the graphite sheet 11 of each Example. This is supposedly because, in Comparative Examples 2 and 3, since the baking temperature in the regular baking was low, no graphitization but only carbonization of the compact was performed and graphite layers were not sufficiently formed.

Further, in Comparative Example 1, the thermal conductivity in the X axis direction was nearly equal to that in the Y axis direction. From this fact, it was found that the graphite sheet of Comparative Example 1 had a higher thermal conductivity in a plurality of directions parallel with the surface of the graphite sheet than that in the thickness direction. That is, it was found that the graphite sheet of Comparative Example 1 had a lower anisotropy of thermal conductivity than that of the graphite sheet 11 of each Example. Further, in the graphite sheets of Comparative Example 2 and Comparative Example 3, although the thermal conductivity in the Z axis direction was higher than those in the X axis direction and Y axis direction, the differences between thermal conductivities in the Z axis direction and in the X and Y axis directions were smaller than the differences in, for example, Example 1. From this fact, it was found that the graphite sheets of Comparative Example 2 and Comparative Example 3 had a lower anisotropy of thermal conductivity than that of the graphite sheet 11 of each Example.

The following were found from the result of each Comparative Example. That is, application of a magnet field having magnetic lines of force extending unidirectionally imparts a certain extent of anisotropy of physical properties to a graphite sheet. However, in the case of each peak intensity ratio of less than 10, the extent of imparted anisotropy of physical properties is low and graphite sheets having such a low anisotropy of physical properties are unsuitable for applications requiring anisotropy of physical properties, for example, applications to thermal diffusion from exothermic bodies.

The invention claimed is:

1. A graphite sheet,
wherein the peak intensity ratio (P100/002) of the (100) diffraction peak and the (002) diffraction peak by X-ray diffractometry, and the peak intensity ratio (P110/002) of the (110) diffraction peak and the (002) diffraction peak by X-ray diffractometry are set at 10 or more.

2. The graphite sheet according to claim 1,
wherein the graphite sheet comprises a plurality of laminated graphite layers, and
wherein a plane spacing (d002) between the graphite layers is less than 0.3420 nm.

3. A method for manufacturing the graphite sheet according to claim 1, comprising:
preparing a polymer liquid which contains a polymer having carbon in molecular chains thereof and develops optical anisotropy;
unidirectionally orienting the molecular chains of the polymer in a certain direction;
obtaining a compact from the polymer liquid in a state that the orientation of the molecular chains of the polymer is maintained; and
carbonizing and thereafter graphitizing the compact.

4. The method according to claim 3,
wherein, in the obtaining a compact, an orientation degree A in the certain direction of the molecular chains of the polymer in the compact is set at 0.6 or more and less than 1.0, the orientation degree A being determined by the following expression (1) from the X-ray diffractometry:

Orientation degree $A=(180-\Delta\beta)/180$    (1), wherein $\Delta\beta$ is a half value width when an X-ray diffraction intensity distribution from 0 to 360 degrees in the azimuthal angle direction by fixing a peak scattering angle by X-ray diffractometry of the compact.

5. The method according to claim 3,
wherein the polymer is a polybenzazole containing at least one of recurring units represented by the following general formulas (1) to (4):

[Formula 1]

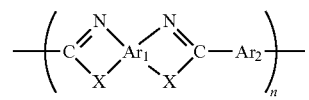

(1)

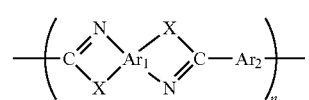

(2)

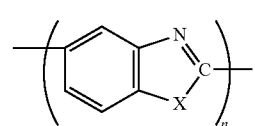

(3)

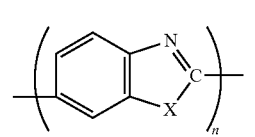

(4)

wherein X denotes a sulfur atom, an oxygen atom or an imino group; $Ar_1$ and $Ar_2$ denote an aromatic hydrocarbon group; and n denotes an integer of 10 to 500.

6. The method according to claim 3,
wherein the orienting the molecular chains of the polymer comprises orienting the molecular chains of the polymer by application of a magnetic field or an electric field.

7. The method according to claim 3,
wherein the carbonizing and thereafter graphitizing the compact comprises:
prebaking the compact in the temperature range of 1,000 to 1,400° C.; and
regularly baking the prebaked compact in the temperature range exceeding 2,000° C. and 3,000° C. or less.

\* \* \* \* \*